United States Patent [19]

Suzuki et al.

[11] Patent Number: 4,845,622
[45] Date of Patent: Jul. 4, 1989

[54] SYSTEM AND METHOD FOR AUTOMATICALLY CONTROLLING CRUISING SPEED OF A VEHICLE

[75] Inventors: Koichi Suzuki; Kiyoshi Konishi; Toshio Iwaoka; Yuichi Yamaguchi; Eisaku Hori; Satoru Sekiguchi, all of Kanagawa, Japan

[73] Assignees: Nissan Motor Company Limited; Jidosha Denki Kogyo Kabushiki, both of Yokohama, Japan

[21] Appl. No.: 109,031

[22] Filed: Oct. 16, 1987

[30] Foreign Application Priority Data

Oct. 17, 1986 [JP] Japan .................. 61-245412

[51] Int. Cl.⁴ ............................................ B60K 31/00
[52] U.S. Cl. ........................... 364/426.04; 364/431.07; 123/352; 180/179
[58] Field of Search ...................... 364/426.04, 431.07; 123/352; 180/170, 176, 179

[56] References Cited

U.S. PATENT DOCUMENTS 4,707,792  11/1987  Naitou ................................ 123/352
4,725,969  2/1988  Onogi et al. .................... 364/431.07
4,729,104  3/1988  Hara ..................................... 123/352

FOREIGN PATENT DOCUMENTS 60-163735  8/1985  Japan .

Primary Examiner—Gary Chin
Attorney, Agent, or Firm—Foley & Lardner, Schwartz, Jeffery, Schwaab, Mack, Blumenthal & Evans

[57] ABSTRACT

A system and method for automatically controlling a cruising speed of a vehicle which can maintain a vehicle speed at a desired cruising speed is disclosed in which a plurality of initialization signal values are set after an accelerator switch installed in a command switch is initially operated and thereafter is released and again operated to command a desired acceleration of the vehicle irrespective of the type of vehicle using the system, i.e., according to the vehicle speed. Second and third initialization signal values have predetermined functional relationships to a first initialization signal value which is set when the accelerator switch is initially operated. These signal values are, e.g., time widths for which a vacuum supply valve of a throttle valve actuator is opened so that an engine throttle valve is opened to increase the vehicle speed.

18 Claims, 4 Drawing Sheets

SYSTEM AND METHOD FOR AUTOMATICALLY CONTROLLING CRUISING SPEED OF A VEHICLE

BACKGROUND OF THE INVENTION

The present invention relates to a system and method for automatically controlling the cruising speed of a vehicle so as to maintain the vehicle speed at a desired cruising speed.

A Japanese Patent Application first publication Sho 60-163735 published on Aug. 26, 1985 exemplifies one such cruising speed controlling system for vehicles.

The disclosed cruising speed controlling system includes a controller, a power supply of which is supplied from a vehicle battery via an ignition switch and main switch. The controller includes a power supply regulator receiving a power supply voltage from the vehicle battery via the main switch and maintaining the power supply voltage at a constant voltage required to operate a microcomputer. The microcomputer includes a CPU (Central Processing Unit), Input Port, Output Port, ROM (Read Only Memory) which permanently stores a control program, RAM which temporarily stores operating variables for settling an opening angle of a throttle valve (to be described later), and a bus line. It should be noted that ROM receives its power supply voltage from the vehicle battery via another power supply circuit to prevent erasure of the contents of the ROM.

The Input Port is connected to both a vehicle speed sensor 12 and a command switch used to control the cruising speed.

The command switch includes a set switch through which the cruising speed control for the vehicle to automatically run at a constant speed is commanded, an accelerator switch through which a constant acceleration control for the vehicle to automatically accelerate at a constant rate is commanded, and a resume switch (reset switch) through which a recovery of the vehicle speed to a stored vehicle cruising speed is commanded.

On the other hand, the output port of the controller is connected to a relay and an actuator.

When the relay receives the power supply and the relay contact is closed, the actuator receives the power supply. The actuator includes a ventilation valve, safety valve, and vacuum supply valve. When the vacuum valve is open and simultaneously the ventilation valve and safety valve are closed, negative pressure is introduced into a negative pressure chamber so that a throttle valve of a vehicular engine is actuated in an open direction. On the other hand, when the ventilation valve is opened with the vacuum valve and safety valve simultaneously closed, atmospheric pressure is introduced into the negative pressure chamber so that the throttle valve is actuated in a closed direction.

Furthermore, in a power supply line between the relay and main switch, a brake switch which is opened when a brake operation through a brake pedal is carried out and a clutch switch which is opened when a clutch of a vehicular transmission is operated are installed.

During the cruising speed control, the power supply to the relay is interrupted when a brake pedal is depressed and/or when a clutch pedal is depressed. Therefore, the actuation of the throttle valve through the actuator is released.

In addition, a set signal, generated when a switch of a stop lamp which is lighted when the brake pedal is depressed, is supplied to the input port of the microcomputer to release the cruising speed control for the controller.

In the cruising speed controlling system disclosed, e.g., in the above-identified Japanese Patent Application publication, a first initialize signal to be supplied to the actuator is set to prevent a drop of the vehicle speed immediately after the accelerator switch is operated, a tap-up initialize signal to be supplied to the actuator is set to make a minute speed increase of the vehicle speed when the accelerator switch is operated after the constant acceleration control is ended in response to non-operation of the accelerator switch, and a small initialize signal to be supplied to the actuator is set to improve speed adjustment characteristics during the acceleration occurring while the accelerator switch is again operated.

However, since in the cruising speed controlling apparatus for the vehicle one of the initialize signals has no correlation to the other initialize signals and they have mutually different constant values, and they are set to constant values irrespective of the vehicle speed, the constant values thereof need to be determined after tuning is carried out whenever the systems are installed in the vehicles in order to adjust them to a plurality of different vehicle models having different power demands. Consequently, the operations for installation of the system in each vehicle is troublesome and installation costs are increased. In addition, since each initialize signal is not set to an appropriate value according to the vehicle speed, it is difficult for the response characteristics at low vehicle speeds and at a high vehicle speeds to become compatible.

SUMMARY OF THE INVENTION

It is, therefore, an object of the present invention to provide an improved system and method for automatically controlling a cruising speed of a vehicle.

It is another object of the present invention to provide the system and method for automatically controlling the cruising speed of a vehicle in which no tuning of the system for different types of vehicles is needed.

It is still another object of the present invention to provide a system and method for automatically controlling the cruising speed for the vehicle which is compatible to response characteristics at both high and low vehicle speeds.

It is further an object of the present invention to provide a system and method for automatically controlling the cruising speed in which the other initialize signals are set so as to have a functional relationship to the first initialize signal which corresponds to the vehicle speed.

The above-described objects can be achieved by providing a system for automatically controlling a cruising speed of a vehicle comprising: (a) first unit for adjusting a vehicular engine speed; (b) second unit through which a desired change of a speed of the vehicle is commanded (c) third unit for detecting the vehicle speed; (d) fourth unit for setting a first value of a first initialization signal and producing the first signal by which the vehicle speed is changed whenever the desired change of the vehicle speed is commanded through the second unit, the first value being set according to the vehicle speed detected by the third unit; (e) fifth unit for setting a second value of a second control signal and producing the second signal by which the vehicle speed is changed at a constant rate after the fourth unit sets the first signal value and produces the first initialization signal; and (f) sixth unit for selecting one of the first and second values according to the command of the desired change of the vehicle speed through the second unit and actuating the first unit to adjust the engine speed so that the vehicle speed is adjusted according to the selected one of the first and second values.

The above-described objects can also be achieved by providing a system for automatically controlling a cruising speed of a vehicle, comprising: (a) an actuator for actuating a throttle valve of a vehicular engine in a direction to change a vehicle speed; (b) a switch through which a desired change of a vehicle speed is commanded; (c) first unit for detecting the vehicle speed; (d) second unit for setting a first initialize signal value by which the vehicle speed is initially changed immediately after the desired change of the vehicle speed is initially commanded through the switch, a second initialize signal value by which the vehicle speed is changed immediately after the command of the desired change of the vehicle speed through the switch is performed a second time commanded through the switch and a third initialize signal value by which a vehicle speed response characteristic is modified after the second initialize signal value has been set during the second command of the desired change through the switch the first, second and third signal values being set according to the detected vehicle speed; (e) third unit for setting a control signal value by which the vehicle speed is changed at a constant rate after the second unit sets the first initialize signal value; and (f) fourth unit for selecting one of the first, second and third initialize signal values according to the command of the desired change of the vehicle speed through the switch and actuating the first unit to adjust the engine speed so that the vehicle speed is adjusted according to the selected one of the first, second, and third signal values and control signal value.

The above-described objects can also be achieved by providing a system for automatically controlling a cruising speed of a vehicle, comprising: (a) first unit for adjusting an engine speed; (b) second unit through which a desired change of a vehicle speed is commanded; (c) third unit for setting initialization value by which the vehicle speed is initially changed whenever the desired change of the vehicle speed is commanded through the second unit, the initialization value being set irrespective of a type of the vehicle using the system; (d) fourth unit for setting a control value with which the vehicle speed is changed at a constant rate after the third unit establishes the initialization value; and (e) fifth unit for selecting one of the initialization and control values according to the command of the desired change of the vehicle speed through the second unit and actuating the first unit to adjust the engine speed so that the vehicle speed is adjusted according to the selected one of the initialization and control values.

The above-described objects can also be achieved by providing a method for automatically controlling a cruising speed of a vehicle, comprising the steps of: (a) providing means through which a desired change of a vehicle speed is commanded and determining whether the desired change of the vehicle speed is commanded; (b) detecting the vehicle speed; (c) setting and producing a first initialization value by which the vehicle speed is changed immediately after the desired change of the vehicle speed is commanded in the step (a); (d) setting and producing a first control value by which the vehicle speed is changed at a first constant rate after the first value has been set and produced in the step (c); (e) setting and producing a second control value by which the vehicle speed is kept constant after the command of the desired change of the vehicle speed is released; and (f) setting and producing second and third initialization values by which the vehicle speed is changed at a second constant rate with a predetermined vehicle speed response characteristic immediately after the desired change of the vehicle speed is again commanded a second time, the first, second, and third initialization values being set according to the vehicle speed detected at the step (b).

DETAILED DESCRIPTION OF THE PREFERRED EMBODIMENT

Reference will hereinafter be made to the drawings in order to facilitate understanding of the present invention.

Figure 1A:
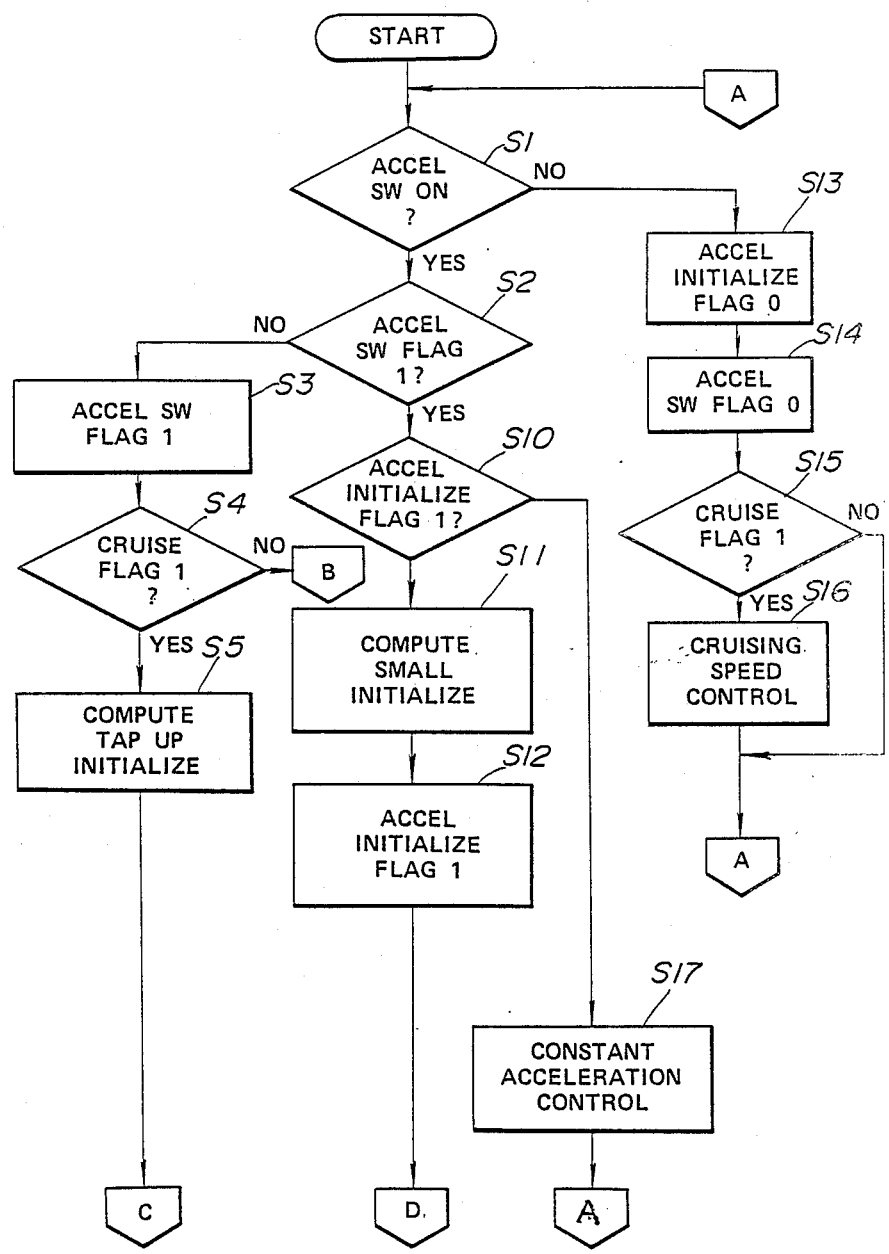
FIGS. 1(A) and 1(B) are a flowchart of a vehicle speed control program executed in a preferred embodiment of a system for automatically controlling a cruising speed for a vehicle according to the present invention.
Figure 1B:
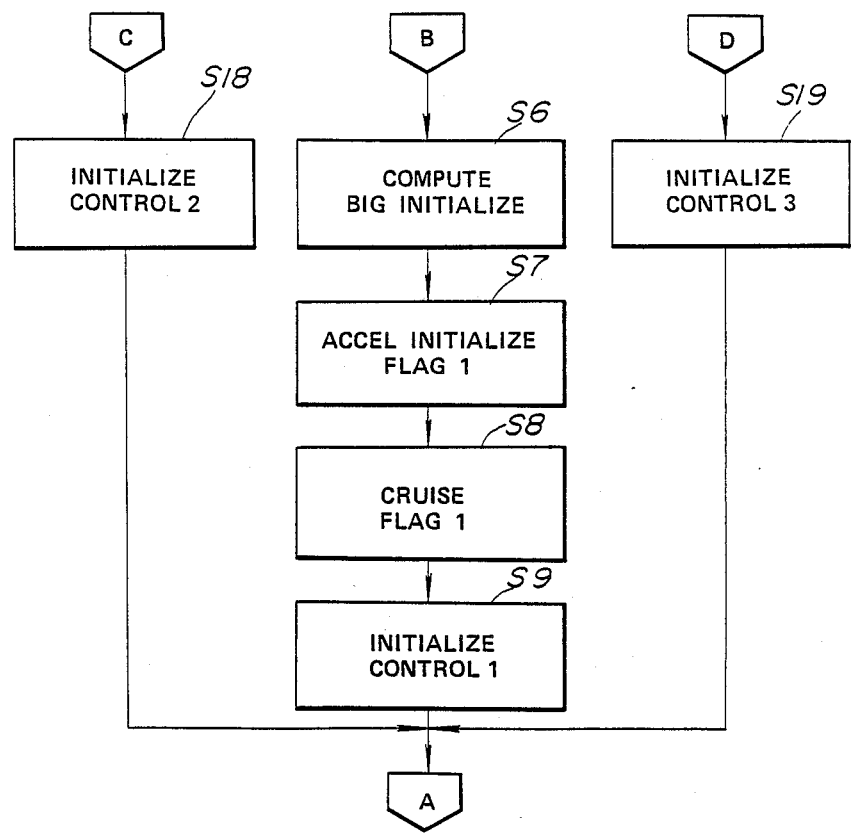

FIGS. 1(A) and 1(B) are a program flowchart of operations executed in a preferred embodiment of a system for automatically controlling the cruising speed of a vehicle according to the present invention.

The operations shown in FIGS. 1(A) and 1(B) are carried out for each predetermined period.

Figure 2:
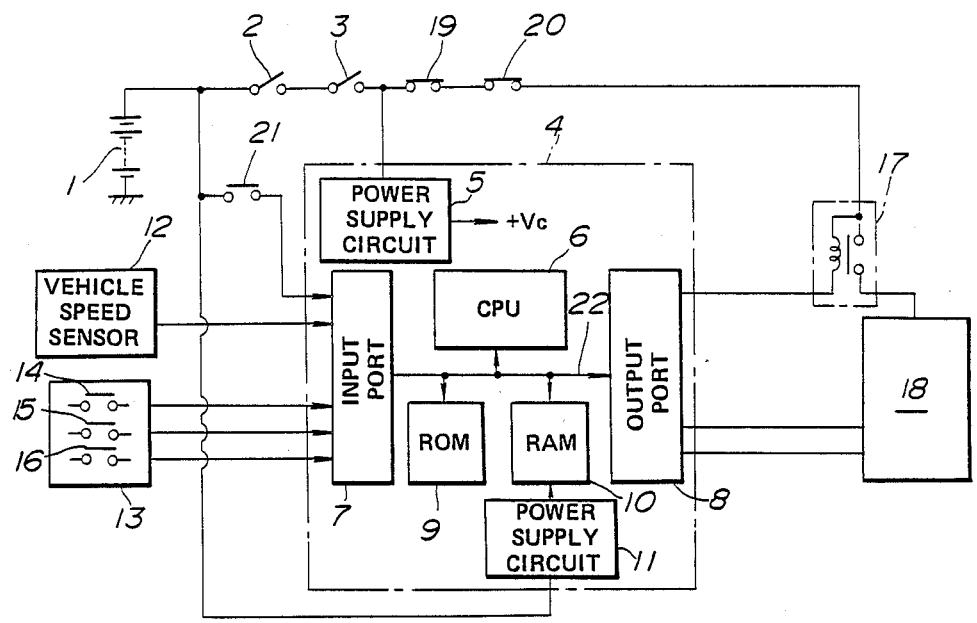
FIG. 2 is a simplified circuit block diagram of the preferred embodiment shown in FIGS. 1(A) and 1(B).

FIG. 2 shows circuit construction of the preferred embodiment.

The automatic cruising speed controlling system includes: a vehicle battery 1; an ignition switch 2; a main switch 3; a controller 4; a vehicle speed sensor 12; a command switch 13; a relay 17; an actuator 18; a brake switch 19; a clutch switch 20; and a stop lamp switch 21. The controller 4 includes: a power supply circuit 5; a CPU 6; an Input Port 7; an Output Port 8; a ROM 9; a RAM 10; and another power supply circuit 11. The command switch 13 includes a set switch 14, an accelerator switch 15, and a resume switch 16.

The circuit construction of the preferred embodiment is substantially the same as those disclosed in the Japanese Patent Application first publication sho 60-163735 described in the BACKGROUND OF THE INVENTION and two U.S. Pat. applications Ser. No. 043,468 filed on Apr. 28, 1987 and Ser. No. 055,516 filed on May 29, 1987.

The latter two U.S. Pat. applications are hereby incorporated by reference.

Figure 3:
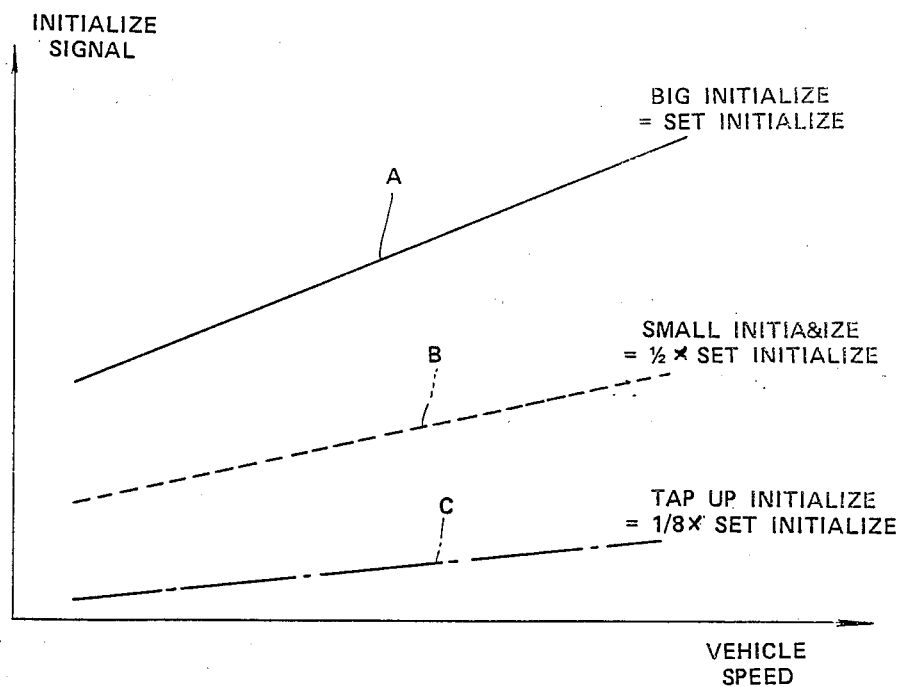
FIG. 3 is a characteristic graph representing each initialize signal variation corresponding to the vehicle speed.

In a step S1, the CPU 6 determines whether the accelerator switch 15 shown in FIG. 2 is turned to ON. If the accelerator switch 15 is turned to ON, the routine goes to a step S2 in which the CPU 6 determines whether an accelerator switch flag is "1" or "0". If the accelerator switch flag is "0" in the step S2, the routine goes to a step S3 in which the accelerator flag is set to "1". In the next step S4, the CPU 6 determines whether a cruise flag is set to "1" or "0". If the cruise flag is set to "0", the routine goes to a step P6 in which a first initialize signal value computation is carried out. The first initialize signal computation is such that the CPU 6 sets an initial value of a control signal supplied to the actuator 18 to prevent a vehicle speed drop from occurring when either the set switch 14 or accelerator switch 15 is operated. In the system disclosed in the Japanese Patent Application first publication No. sho 60-163735 (hereinafter, referred to simply as the disclosed system), the first initialize signal value is set at a constant value irrespective of the vehicle speed. On the other hand, in the preferred embodiment, the first initialize signal value is set to such a value as to be in proportion to the vehicle speed, as shown in a solid line A of FIG. 3. The first initialize signal value is the same as a set initialize signal value. It should be noted that the first initialize signal value is, e.g., a time width value of the vacuum supply valve in the actuator 18 so that the negative pressure is supplied to the actuator 18 during the time width determined by the first initialize signal value and the actuator 18 actuates the throttle valve in the open direction, the opening value of the throttle valve thus being changed to a larger value than a normal angle value at the present vehicle speed. At this time, the ventilation and safety valves are closed. In addition, the set initialize signal is used when the set switch 14 is turned on and thereafter turned off.

In a step S7, an acceleration initialize flag is set to "1". In a step S8, the cruise flag is set to "1". Then, in a step S9, a fist initialize control is carried out with the previously set big initialize signal outputted. Thereafter, the routine returns to the step S1.

If the accelerator switch 15 remains ON, the accelerator switch flag is set to "1" in the step S2 and an acceleration initialize flag is set to "1" in a step S10. Therefore, the routine goes to a step S17 in which a constant acceleration control is carried out.

Then, if the accelerator switch 15 is changed to an "OFF" position in the step S1, the acceleration initialize flag is "0" and a step S14 in which the acceleration switch flag is "0". Since, in a step S15, the cruise flag is set to "1", the CPU 6 carries out a cruising speed control in a step S16.

Next, if the accelerator switch 15 in the "OFF" position is again turned to "ON", the routine goes to a step S5 via the steps S1, S2, S3, and S4.

In the step S5, the CPU 6 carries out a tap up initialize computation in order to set a tap up initialize signal value to make a minute increase of the vehicle speed. In the disclosed system, the tap up initialize signal level value is set at a constant value irrespective of the vehicle speed. However, in the preferred embodiment, the tap up initialize signal value is set so as to be $\frac{1}{8}$ the first initialize signal value described above, as shown by a dot-and-dash line C of FIG. 3 (tap up initialize signal value=$\frac{1}{8}$×first signal value). In the next step S18, the CPU 6 outputs the previously set tap up initialize signal to carry out the tap up initialize control.

Thereafter, if the accelerator switch 15 remains in the ON state, the routine goes to a step S11 since the accelerator switch flag is set to "1" in the step S2 and the acceleration flag is set to "0" in the step S10. In the step S11, the CPU 6 carries out a second initialization computation in order to set a second initialization value (SMALL INITIALIZE) to improve response characteristics during the acceleration of the vehicle while the accelerator switch 15 is in an on state. In the disclosed system, the second initialize signal value is a constant value irrespective of the above-described first initialize signal value. However, in the preferred embodiment, the second initialize signal value is set at $\frac{1}{2}$ the above-described first initialize signal value (small initialize signal value=$\frac{1}{2}$×first initialize signal value).

In the step S19, the small (second) initialize signal previously set as described above is outputted to an actuator 18 to carry out a small initialization control using the second initialize signal value.

As described hereinabove, in the preferred embodiment, both small initialize and tap up signal values are set so as to have a predetermined functional relationship to the first initialize signal value corresponding to the vehicle speed at the time when both second and third initialize signal values are set. Therefore, separate tuning operations of the system for each type of vehicle in which it is used are not necessary. In addition, since appropriate signal values (time widths) can be outputted to the actuator over all vehicle speed ranges, the response characteristics of the vehicle can be improved.

According to the present invention, since the second initialize signal value is set to make minute increases of the vehicle speed and the third initialize signal value to improve the responsive characteristic during the subsequent acceleration of the vehicle and to have a functional relationship to the first initialize signal value which corresponds to the vehicle speed and thereafter each initialize control of the vehicle speed is started, the tuning operation for adjusting the system to each type of the vehicles is eliminated and responsive characteristics of the vehicle speed at high and low speed ranges are markedly improved.

It will be fully appreciated by those skilled in the art that the foregoing description is made in terms of the preferred embodiment and various changes and modifications may be made without departing from the scope of the present invention which is to be defined by the appended claims.

What is claimed is:

1. A system for automatically controlling a vehicle speed to a desired cruise speed,:
   (a) an actuator for actuating an engine driving force adjusting mechanism to change an operating variable of the engine driving force adjusting mechanism so that the vehicle speed is controlled;
   (b) first means for operatively commanding the actuator to actuate the engine driving force adjusting mechanism so that the vehicle speed is changed at a constant rate, and for operatively commanding the actuator to actuate the engine driving force adjusting mechanism so that the vehicle speed is maintained;
   (c) second means for detecting the vehicle speed;
   (d) third means for setting a first initialize signal and providing the first initialize signal for the actuator during a first initialization control for the actuator to prevent a drop in vehicle speed immediately after the first means operatively commands the actuator to actuate the engine driving force adjusting mechanism so that the vehicle speed is changed at the constant rate, a value of the first initialize signal being set so as to correspond to the detected vehicle speed;
   (e) fourth means for setting a tap-up initialize signal and providing the tap up initialize signal for the actuator during a tap-up initialize for the actuator so as to slightly increase the vehicle speed immediately after the first means operatively commands the actuator to change the vehicle speed, the system executes a constant change rate control of the vehicle speed via the actuator, the first means operatively commands the actuator to maintain the vehicle speed, and thereafter the first means again commands the actuator to change the vehicle speed, a value of the tap-up initialize signal being set so as to have a predetermined functional relationship to the first initialize signal value; and (f) fifth means for setting a small initialize signal and for providing the small initialize signal for the actuator during a small initialize control to improve a response characteristic of the actuator to a control signal produced during the constant change rate control immediately after the tap up initialize control by the fourth means, the small initialize signal being set so as to have the predetermined functional relationship to the first initialize signal value.

2. A system as set forth in claim 1, wherein the third means sets said first initialization signal by which the vehicle speed is initially changed when the change of the vehicle speed is initially operatively commanded through the first means, the first initialization signal is set in order to prevent a change of the vehicle speed opposite to the desired change of the vehicle speed.

3. A system as set forth in claim 1, wherein the third means sets second and third initialization signals by which the vehicle speed is changed and outputs a corresponding signal to the first means whenever the desired change of the vehicle speed is operatively commanded after the first means has been set once and released, and the third means sets the second and third initialization signals so as to increase the vehicle speed by a predetermined rate.

4. A system as set forth in claim 3, wherein the second and third initialization signals have predetermined relationships to the first initialization signal and the third initialization signal is set to increase the vehicle speed at a predetermined rate which is smaller than the constant rate.

5. A system as set forth in claim 4, wherein the third initialization signal is set subsequent to the setting of the second initialization signal for the period in which the desired change of the vehicle speed is being commanded.

6. A system as set forth in claim 4, wherein the first initialization signal is larger than the second and third initialization signals and the third initialization signal is larger than the second initialization signals.

7. A system as set forth in claim 6, wherein the first initialization signal is a multiple of each of the second and third initialization signals.

8. A system as set forth in claim 7, wherein the first initialization signal is equal to the third initialization signal multiplied by 2and is equal to the second initialization signal multiplied by eight.

9. A system as set forth in claim 1, wherein the fourth means actuates the actuator to adjust the engine speed so that the speed of the vehicle remains constant after the command of the desired change of the vehicle speed through the first means is performed.

10. A system for automatically controlling a cruising speed of a vehicle, comprising:

(a) an actuator for actuating a throttle valve of a vehicular engine in a direction to change a vehicle speed;

(b) a switch which is operated in order to command a desired change of vehicle speed;

(c) first means for detecting the vehicle speed;

(d) second means for setting (i) a first initialize signal value by which the vehicle speed is initially changed immediately after the desired change of the vehicle speed is initially commanded through operation of the switch, (ii) a second initialize signal value by which the vehicle speed is changed immediately after a second command of the desired change of the vehicle speed through operation of the switch is performed a second time, and (iii) a third initialize signal value by which a vehicle speed response characteristic is modified after the second initialize signal value has been set during the second command of the desired change through the operation of the switch, the first, second and third initialize signal values corresponding to the detected vehicle speed;

(e) third means for setting a control signal value by which the vehicle speed is changed at a constant rate after the second means sets the first initialize signal value; and (f) fourth means for selecting one of the first, second and third initialize signal values and control signal value in accordance with the command of the desired change of the vehicle speed through operation of the switch and actuating the actuator to adjust the engine speed so that the vehicle speed is adjusted according to the selected one of the first, second, and third initialize signal values and control signal value.

11. A system as set forth in claim 10, wherein the second and third initialize signal values have predetermined functional relationships to the first initialize signal value.

12. A system for automatically controlling the cruising speed of a vehicle, comprising:

(a) first means for adjusting an engine speed;

(b) second means for operatively commanding the first means to adjust the engine speed in order to effect a desired change of a vehicle speed;

(c) third means for setting an initialization value which corresponds to the vehicle speed and by which the vehicle speed is initially changed whenever the desired change of the vehicle speed is operatively commanded through the second means, the initialization value being set irrespective of a type of the vehicle using the system;

(d) fourth means for setting a control value by which the vehicle speed is changed at a constant rate after the third means establishes the initialization value; and (e) fifth means for selecting one of the initialization and control values according to the operative command of the desired change of the vehicle speed through the second means and actuating the first means to adjust the engine speed so that the vehicle speed is adjusted according to the selected one of the initialization and control values.

13. A system as set forth in claim 12, which further comprises sixth means for detecting the vehicle speed and wherein the initialization value is set according to the detected vehicle speed.

14. A system as set forth in claim 13, wherein the control value is set in proportion to the detected vehicle speed.

15. A system as set forth in claim 14, wherein the initialization value is changed according to the number of times the second means operatively commands the desired change of the vehicle speed.

16. A system as set forth in claim 15, wherein the initialization value becomes smaller as the number of times the second means operatively commands the desired change of the vehicle speed increases.

17. A system as set forth in claim 16, wherein the initialization value includes first, second, and third initialization values, the first initialization value being set when the second means operatively commands the desired change of the vehicle speed initially, and the second and third initialization values being set when the second means operatively commands the desired change of the vehicle speed a second time.

18. A method for automatically controlling a cruising speed of a vehicle, comprising the steps of:
  (a) providing means which operatively command a desired change of a vehicle speed and determining whether the desired change of the vehicle speed is commanded;
  (b) detecting the vehicle speed;
  (c) setting and producing a first initialization value which corresponds to the detected vehicle speed and by which the vehicle speed is changed immediately after the means operatively commands a desired change of the vehicle speed in step (a);
  (d) setting and producing a first control value by which the vehicle speed is changed at a first constant rate after the first initialization value is set and produced in step (c);
  (e) setting and producing a second control value by which the vehicle speed is maintained as constant after the means no longer operatively commands the desired change of the vehicle speed; and
  (f) setting and producing second and third initialization values by which the vehicle speed is changed at a second constant rate predetermined vehicle speed response characteristic immediately after the desired change of the vehicle speed is operatively commanded by the means a second time, the first, second, and third initialization values being set according to the vehicle speed detected at step (b).

* * * * *